US011383560B2

(12) United States Patent
Morozumi

(10) Patent No.: US 11,383,560 B2
(45) Date of Patent: Jul. 12, 2022

(54) TIRE FOR TWO-WHEELED AUTOMOTIVE VEHICLE

(71) Applicant: SUMITOMO RUBBER INDUSTRIES, LTD., Kobe (JP)

(72) Inventor: Junichiro Morozumi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 249 days.

(21) Appl. No.: 15/320,583

(22) PCT Filed: Aug. 4, 2015

(86) PCT No.: PCT/JP2015/072010
§ 371 (c)(1),
(2) Date: Dec. 20, 2016

(87) PCT Pub. No.: WO2016/021568
PCT Pub. Date: Feb. 11, 2016

(65) Prior Publication Data
US 2017/0203611 A1    Jul. 20, 2017

(30) Foreign Application Priority Data

Aug. 6, 2014 (JP) .............................. JP2014-159974

(51) Int. Cl.
B60C 15/00         (2006.01)
B60C 11/00         (2006.01)
(Continued)

(52) U.S. Cl.
CPC ............ B60C 15/0009 (2013.01); B60C 9/08 (2013.01); B60C 11/0083 (2013.01);
(Continued)

(58) Field of Classification Search
CPC . B60C 15/0072; B60C 15/00; B60C 15/0009; B60C 15/0018; B60C 15/0036;
(Continued)

(56) References Cited

U.S. PATENT DOCUMENTS 1,584,284 A * 5/1926 Grabau ............... B60C 15/0072
152/553 X
3,068,926 A * 12/1962 Jacob .................. B60C 15/0045
152/554 X
(Continued)

FOREIGN PATENT DOCUMENTS

DE     32 42 323 A1 *  6/1983
DE     34 11 667 A  *  11/1984
(Continued)

OTHER PUBLICATIONS

English translation of JP 2-18104 A, Jan. 22, 1990.*
English machine translation of JP 4-365602 A, Dec. 17, 1992.*
English machine translation of JP 2005-247061 A, Sep. 15, 2005.*

Primary Examiner — Adrienne C. Johnstone
(74) Attorney, Agent, or Firm — Birch, Stewart, Kolasch & Birch, LLP

(57) ABSTRACT

A tire for a two-wheeled automotive vehicle includes a carcass that is extended on and between one of beads and the other of the beads along inner sides of a tread and sidewalls. The carcass includes a first ply and a second ply that is layered outward of the first ply. The first ply is turned up around the beads from an inner side toward an outer side in an axial direction. By the turning-up, the first ply includes a main portion and turned-up portions. The second ply is turned back around the beads from the outer side toward the inner side in the axial direction. By the turning-back, the second ply includes a main portion and turned-back portions.

8 Claims, 4 Drawing Sheets

(51) Int. Cl.
　　　*B60C 15/02*　　　(2006.01)
　　　*B60C 15/04*　　　(2006.01)
　　　*B60C 9/08*　　　(2006.01)

(52) U.S. Cl.
　　　CPC .......... *B60C 15/00* (2013.01); *B60C 15/0045* (2013.01); *B60C 15/0072* (2013.01); *B60C 15/02* (2013.01); *B60C 15/04* (2013.01); *B60C 15/0036* (2013.01); *B60C 2015/009* (2013.01); *B60C 2015/046* (2013.01); *B60C 2200/10* (2013.01)

(58) Field of Classification Search
　　　CPC ............ B60C 15/0045; B60C 15/0054; B60C 2015/009
　　　USPC .................. 152/553, 550, 551, 552, 554
　　　See application file for complete search history.

(56) References Cited

U.S. PATENT DOCUMENTS

| | | | | |
|---|---|---|---|---|
| 3,301,302 A | * | 1/1967 | Wild | B60C 15/0072 152/553 |
| 4,024,901 A | * | 5/1977 | Poque | B60C 15/0072 152/553 X |
| 4,073,330 A | * | 2/1978 | Allard | 152/553 X |
| 4,215,735 A | | 8/1980 | Sato | |
| 4,246,949 A | | 1/1981 | Kawasaki et al. | |
| 4,390,052 A | * | 6/1983 | Mendiola | B60C 15/0036 152/554 |
| 4,510,983 A | * | 4/1985 | Ohkuni | B60C 15/0036 152/554 X |
| 4,770,222 A | * | 9/1988 | Mezzanotte | B60C 15/0018 |
| 4,773,463 A | * | 9/1988 | Okuni | B60C 15/0045 152/554 X |
| 5,234,043 A | * | 8/1993 | Suzuki | B60C 15/0045 152/554 X |
| 5,379,818 A | * | 1/1995 | Suzuki | B60C 15/0045 |
| 5,400,847 A | * | 3/1995 | Suzuki | 152/554 X |
| 5,482,102 A | * | 1/1996 | Suzuki | B60C 15/0018 152/550 X |
| 8,776,853 B2 | * | 7/2014 | Bestgen | B60C 15/0045 152/554 X |
| 2011/0030871 A1 | * | 2/2011 | Bestgen | B60C 15/0045 |
| 2011/0132509 A1 | | 6/2011 | Kasai | |
| 2011/0132514 A1 | * | 6/2011 | Bestgen | B60C 15/0045 |
| 2011/0308688 A1 | * | 12/2011 | Bestgen | B60C 15/0045 152/552 |
| 2013/0008580 A1 | | 1/2013 | Matsunami | |
| 2016/0159156 A1 | * | 6/2016 | Knavish | B60C 15/0072 |

FOREIGN PATENT DOCUMENTS

| | | | |
|---|---|---|---|
| EP | 0 549 311 A1 | * | 6/1993 |
| EP | 0 635 383 A1 | * | 1/1995 |
| EP | 2 599 646 A1 | | 6/2013 |
| GB | 1 210 935 A | | 11/1970 |
| JP | JR 53-126601 A | | 11/1978 |
| JP | 54-162306 A | | 12/1979 |
| JP | 58071205 A | * | 4/1983 |
| JP | 1-262205 A | | 10/1989 |
| JP | 02018104 A | * | 1/1990 |
| JP | 2-155812 A | | 6/1990 |
| JP | 04365602 A | * | 12/1992 |
| JP | 2000-62416 A | | 2/2000 |
| JP | 2004276715 A | * | 10/2004 |
| JP | 2005247061 A | * | 9/2005 |
| JP | 2010-36695 A | | 2/2010 |
| JP | 2013-35540 A | | 2/2013 |
| JP | 2013-67183 A | | 4/2013 |
| WO | WO 00/26044 A1 | | 5/2000 |

\* cited by examiner

Comparative

Comparative

TIRE FOR TWO-WHEELED AUTOMOTIVE VEHICLE

TECHNICAL FIELD

The present invention relates to pneumatic tires that are to be mounted to two-wheeled automotive vehicles.

BACKGROUND ART

FIG. 4 shows a conventional tire 1 that is to be mounted to a front wheel of a two-wheeled automotive vehicle. The tire 1 is disclosed in JP2013-35540. The tire 1 includes a first carcass ply 2 and a second carcass ply 3. The first carcass ply 2 is turned up around beads 4 from the inner side toward the outer side. The second carcass ply 3 is not wound around the beads 4. The second carcass ply 3 covers end portions of the first carcass ply 2 that is turned up. The tire 1 includes the first carcass ply 2 and the second carcass ply 3, whereby stiffness is appropriately obtained.

CITATION LIST

Patent Literature

Patent Literature 1: JP2013-35540
Patent Literature 2: JP01-262205
Patent Literature 3: JP2010-36695
Patent Literature 4: JP02-155812
Patent Literature 5: JP2000-62416

SUMMARY OF THE INVENTION

Problems to be Solved by the Invention

The tire 1 was mounted to a two-wheeled automotive vehicle and a running test was conducted. In the running test for the tire 1, improvement of stiffness was confirmed. By the improvement of stiffness, ride comfort and steering stability are improved. However, it was confirmed that a degree of improvement in stiffness was various among the tires 1 which were produced as samples according to the same specifications. In particular, it was confirmed that the variation was likely to occur in the tire 1 in which the radius of curvature of a tread 5 was small. The inventors attempted to improve the tire 1 in various manners in order to stably obtain an effect of improving stiffness.

An object of the present invention is to provide a tire, for a two-wheeled automotive vehicle, which is excellent in ride comfort and steering stability.

Solution to the Problems

A pneumatic tire, for a two-wheeled automotive vehicle, according to the present invention includes: a tread; a pair of sidewalls; a pair of beads; and a carcass. The sidewalls extend almost inward from ends, respectively, of the tread in a radial direction. The beads are disposed almost inward of the sidewalls, respectively, in the radial direction. The carcass is extended on and between one of the beads and the other of the beads along inner sides of the tread and the sidewalls. The carcass includes a first ply and a second ply that is layered outward of the first ply. The first ply is turned up around the beads from an inner side toward an outer side in an axial direction. By the first ply being turned up, the first ply includes a main portion and turned-up portions. The second ply is turned back around the beads from the outer side toward the inner side in the axial direction. By the second ply being turned back, the second ply includes a main portion and turned-back portions.

Preferably, a height H from an inner end P of the second ply that is turned back around the beads, to a turn-back end, is greater than or equal to 10 mm and not greater than 20 mm.

Preferably, each of the beads includes a core and an apex that extends outward from the core in the radial direction. The core has a bottom surface that is formed as a plane that faces inward in the radial direction.

Preferably, a ratio BW/SW of a width BW of the bottom surface to a seat surface width SW of a seat surface which contacts with a seat surface of a normal rim, is greater than or equal to 0.4 and not greater than 0.7.

Preferably, a radius of curvature of the tread at an equator plane, is greater than or equal to 50 mm and not greater than 150 mm.

Advantageous Effects of the Invention

In the tire, for a two-wheeled automotive vehicle, according to the present invention, the carcass has the first ply and the second ply, whereby stiffness is appropriately improved. The tire is excellent in ride comfort and steering stability. The second ply is turned back around the beads, whereby an effect of improving stiffness is stably obtained.

DESCRIPTION OF EMBODIMENTS

The following will describe in detail the present invention based on preferred embodiments with reference where appropriate to the accompanying drawing.

Figure 1:
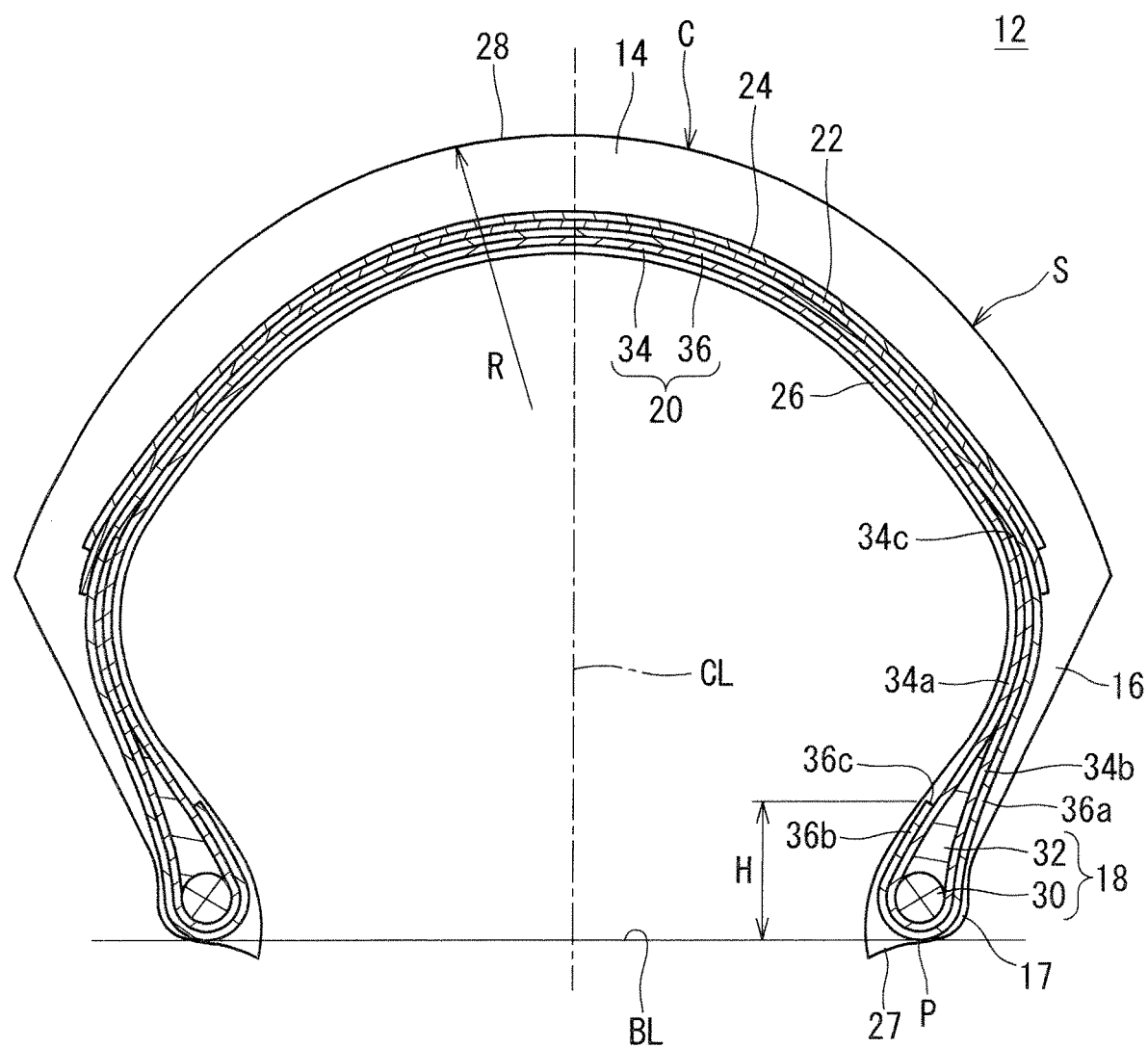
FIG. 1 is a cross-sectional view of a pneumatic tire according to one embodiment of the present invention.

FIG. 1 is a cross-sectional view of a pneumatic tire 12 according to one embodiment of the present invention. The tire 12 is mounted to a front wheel of a two-wheeled automotive vehicle. In FIG. 1, the up-down direction represents the radial direction of the tire 12, the right-left direction represents the axial direction of the tire 12, and the direction perpendicular to the drawing sheet represents the circumferential direction of the tire 12. An alternate long and short dash line CL in FIG. 1 represents the equator plane of the tire 12. The tire 12 has a shape which is almost bilaterally symmetric about the equator plane. A solid line BL is a straight line that extends in the axial direction, and represents a bead base line. The bead base line is a line that defines a rim diameter of a normal rim on which the tire 12 is mounted (see JATMA).

The tire 12 includes a tread 14, sidewalls 16, clinches 17, beads 18, a carcass 20, a belt 22, a band 24, an inner liner 26, and chafers 27. The tire 12 is a tubeless type pneumatic tire.

The tread 14 is formed of crosslinked rubber, and has a shape that projects outward in the radial direction. The tread 14 forms a tread surface 28 that can contact with a road surface. An arrow R in FIG. 1 represents a radius of curvature of the tread 14. The radius R of curvature is measured along the tread surface 28 at the equator plane. Grooves may be formed in the tread surface 28, thereby forming a tread pattern, which is not shown.

The sidewalls 16 extend from the ends of the tread 14 almost inward in the radial direction. The sidewalls 16 are formed of crosslinked rubber. The sidewalls 16 absorb impact from a road surface due to deformation. The sidewalls 16 prevent the carcass 20 from being damaged.

The clinches 17 are disposed almost inward of the sidewalls 16 in the radial direction. The clinches 17 are disposed outward of the beads 18 and the carcass 20 in the axial direction. The clinches 17 are formed of crosslinked rubber excellent in wear resistance. The clinches 17 are brought into contact with flanges of a rim.

The beads 18 are disposed inward of the sidewalls 16 in the radial direction. The beads 18 are disposed inward of the clinches 17 in the axial direction. Each bead 18 includes a core 30 and an apex 32 that extends outward from the core 30 in the radial direction. The core 30 is formed such that a non-stretchable wire is wound so as to be ring-shaped. A steel wire is typically used for the core 30. The apex 32 is tapered outward in the radial direction. The apex 32 is formed of highly hard crosslinked rubber.

For the beads 18, a cable bead structure in which the cross-sectional shape of the core 30 is round is used. Around a core wire, another wire is helically wound, thereby forming the core 30. Since the cable bead structure is used, rotation of the cores 30 according to deformation of side portions of the tire 12 is facilitated. The tire 12 is excellent in transient characteristics in cornering. The tire 12 is excellent in steering stability in cornering.

The carcass 20 is extended on and between the beads 18 on both sides, along the inner sides of the tread 14 and the sidewalls 16. The carcass 20 includes a first ply 34 and a second ply 36. The first ply 34 is wound around the beads 18 from the inner side toward the outer side in the axial direction. The second ply 36 is layered outward of the first ply 34 in the radial direction. The second ply 36 is wound around the beads 18 from the outer side toward the inner side in the axial direction.

The first ply 34 is formed of a first carcass cord and topping rubber, which are not shown. The first carcass cord tilts relative to the equator plane. An absolute value of a tilt angle thereof relative to the equator plane is greater than or equal to 60° and not greater than 90°. The second ply 36 is formed of a second carcass cord and topping rubber. The second carcass cord tilts relative to the equator plane. An absolute value of a tilt angle thereof relative to the equator plane is greater than or equal to 60° and not greater than 90°. In other words, the tire 12 is a radial tire. In the tire 12, a direction in which the first carcass cord tilts and a direction in which the second carcass cord tilts are opposite to each other with respect to the equator plane. The absolute value of the tilt angle of the first carcass cord and the absolute value of the tilt angle of the second carcass cord are equal to each other. The first carcass cord and the second carcass cord are each formed of an organic fiber in general. Preferable examples of the organic fiber include polyester fibers, nylon fibers, rayon fibers, polyethylene naphthalate fibers, and aramid fibers.

The belt 22 is disposed outward of the carcass 20 in the radial direction. The belt 22 is layered over the carcass 20. The belt 22 reinforces the carcass 20. The belt 22 inhibits protrusion of the tread 14 in high speed running. The belt 22 allows improvement of high speed durability and uniformity. The belt 22 includes multiple belt cords aligned with each other, and topping rubber. The belt cords tilt relative to the equator plane. An absolute value of a tilt angle is greater than or equal to 10° and not greater than 35°. A material of the belt cords is preferably an organic fiber. For the belt cords, steel may be used. The belt 22 may include an inner layer and an outer layer. When the belt includes the inner layer and the outer layer, a direction in which the belt cords of the inner layer tilt and a direction in which the belt cords of the outer layer tilt are opposite to each other. Further, the tire 12 may not include the belt 22.

The band 24 is layered outward of the carcass 20 in the radial direction. The band 24 is layered outward of the belt 22 in the radial direction. The band 24 includes a cord and topping rubber, which are not shown. The cord extends substantially in the circumferential direction, and is helically wound. The band 24 has a so-called jointless structure. The cord holds the tire 12 in the radial direction. The band 24 inhibits lifting of the belt 22. The cord is formed of an organic fiber in general. Preferable examples of the organic fiber include nylon fibers, polyester fibers, rayon fibers, polyethylene naphthalate fibers, and aramid fibers. Further, the tire 12 may not include the band 24.

The inner liner 26 is joined to the inner circumferential surface of the carcass 20. The inner liner 26 is formed of crosslinked rubber. For the inner liner 26, rubber excellent in airtightness is used. The inner liner 26 acts to maintain an internal pressure of the tire 12.

The chafers 27 are disposed near the beads 18. When the tire 12 is mounted on a rim, the chafers 27 contact with the rim. Portions near the beads 18 are protected due to the contact. In the present embodiment, the chafers 27 are integrated with the clinches 17, respectively. Therefore, the material of the chafers 27 is the same as the material of the clinches 17. The chafers 27 may be formed of a fabric and rubber impregnated into the fabric.

As shown in FIG. 1, the first ply 34 is turned up around the beads 18 from the inner side toward the outer side in the axial direction. By the turning-up, the first ply 34 includes a main portion 34a and turned-up portions 34b. The turned-up portions 34b have turn-up ends 34c positioned at the outer ends in the radial direction. The turn-up ends 34c are disposed inward of the tread 14 and positioned inward of the shoulder region. Each turned-up portion of the first ply extends in the radial direction from the respective bead to axially inward of the tread such that the turned up end is positioned axially inward and radially outward of the respective axially outermost end of the tread surface.

The second ply 36 is turned back around the beads 18 from the outer side toward the inner side in the axial direction. By the turning-back, the second ply 36 includes a main portion 36a and turned-back portions 36b. The turned-back portions 36b have turn-back ends 36c positioned at the outer ends in the radial direction. The turn-back ends 36c are each disposed inward of the apex 32 in the axial direction. The main portion 36a is extended on and between the axially outer side portion of one of the beads 8 and the axially outer side portion of the other of the beads. The second ply 36 that has the main portion 36a is referred to as a floating ply.

In FIG. 1, a point P represents a radially inner end of the second ply 36 that is turned back around each bead 18. A double-headed arrow H represents a height from the inner end P to the turn-back end 36c. The height H is measured as a distance in a straight line in the radial direction.

In the tire 12, in the main portion 34a of the first ply 34, a tensile force is generated between the paired beads 18 on the side inward of the beads 18 in the axial direction. In the main portion 36a of the second ply 36, a tensile force is generated between the paired beads 18 on the side outward of the beads 18 in the axial direction. A tensile force is generated in the carcass 20 on both the side inward of the paired beads 18 in the axial direction, and the side outward of the paired beads 18 in the axial direction. The main portion 34a and the main portion 36a in each of which a tensile force is generated surround the beads 18. The carcass 20 allows stiffness of the tire 12 to be appropriately improved in a range between one of the beads 18 and the other of the beads 18. In the tire 12, the carcass 20 allows reduction of the thickness (thickness from the inner side surface of the inner liner 26 to the outer surface of each sidewall 16) of each sidewall portion, thereby improving stiffness. The carcass 20 can contribute to reduction in weight of the tire 12 and reduction of fuel consumption.

As described above, a tensile force is generated between the paired beads 18 in the main portion 36a of the second ply 36. The second ply 36 includes the turned-back portions 36b, whereby the second ply 36 is assuredly fixed. Also when pressurizing and heating are performed in vulcanization process, the second ply 36 is inhibited from being displaced. The tire 12 having the turned-back portions 36b allows an effect of improving stiffness to be stably obtained.

In this viewpoint, the height H from the inner end P to the turn-back end 36c is preferably greater than or equal to 10 mm, and more preferably greater than or equal to 15 mm. Meanwhile, when the height H is excessively increased, stiffness of the tire 12 is increased to reduce ride comfort. In this viewpoint, the height H is preferably not greater than 40 mm, more preferably not greater than 30 mm, and particularly preferably not greater than 25 mm.

In a two-wheeled automotive vehicle, its body is tilted inward in cornering. In order to facilitate the cornering, the tire 12 has the tread 14 having a small radius R of curvature. In straight running, a center region C of the tread 14 (tread surface 28) mainly contacts with the ground. In cornering, a shoulder region S positioned outward of the center region C in the axial direction mainly contacts with the ground. In general, in a tire for a passenger car which is a four-wheeled automotive vehicle, the radius R of curvature at the equator plane is from 500 mm to 1000 mm. Meanwhile, in a tire for a two-wheeled automotive vehicle, the radius R of curvature at the equator plane is greater than or equal to 50 mm and not greater than 150 mm in general. The radius of curvature of the tire 12 is very small as compared to that of a tire for a four-wheeled automotive vehicle.

In a method for manufacturing the tire 14, components forming the tread 14, the sidewalls 16, the clinches 17, the beads 18, the carcass 20, the belt 22, the band 24, the inner liner 26, and the chafers 27 are combined to perform forming. By the forming, an unvulcanized green tire is obtained. The green tire is pressurized and heated with a mold and a bladder. In the mold, rubber flows and crosslinking is performed to obtain the tire 12.

As described above, in the tire 12, the radius R of curvature of the tread 14 is small. In the green tire for the tire 12, a tensile force acts so as to draw the axial end portions of the first ply 34 and the second ply 36 toward the center region of the tread 14. The tensile force becomes high particularly when pressurizing and heating are performed. In the tire 12, the second ply 36 is turned back around the beads 18. The second ply 36 is disposed and fixed between the cores 30 and a wall surface of the mold when pressurizing and heating are performed. Movement of the second ply 36 is inhibited. Since movement of the second ply 36 is inhibited, an effect of improving stiffness is stably obtained. The tire 12 is stable in quality.

To the tire 12 mounted to a two-wheeled automotive vehicle, such a heavy load as applied to a tire of a four-wheeled automotive vehicle is not applied. Therefore, the second ply 36 need not be turned back around the cores 30 in order to assure stiffness of the tire 12. On the contrary, if the second ply 36 is turned back around the cores 30, productivity is reduced. Therefore, in a tire for a two-wheeled automotive vehicle, the second ply 36 is not turned back around the cores 30 in general. Meanwhile, according to the present invention, the second ply 36 is intentionally turned back around the cores 30 in order to stably obtain an effect of improving stiffness of the tire 12.

In the present invention, the dimensions and angles of the components of the tire 12 are measured in a state where the tire 12 is mounted on a normal rim, and is inflated with air to a normal internal pressure. During the measurement, no load is applied to the tire 12. In the description herein, the normal rim represents a rim which is specified according to the standard with which the tire 12 complies. The "standard rim" in the JATMA standard, the "Design Rim" in the TRA standard, and the "Measuring Rim" in the ETRTO standard are included in the normal rim. In the description herein, the normal internal pressure represents an internal pressure which is specified according to the standard with which the tire 12 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure.

Figure 2:
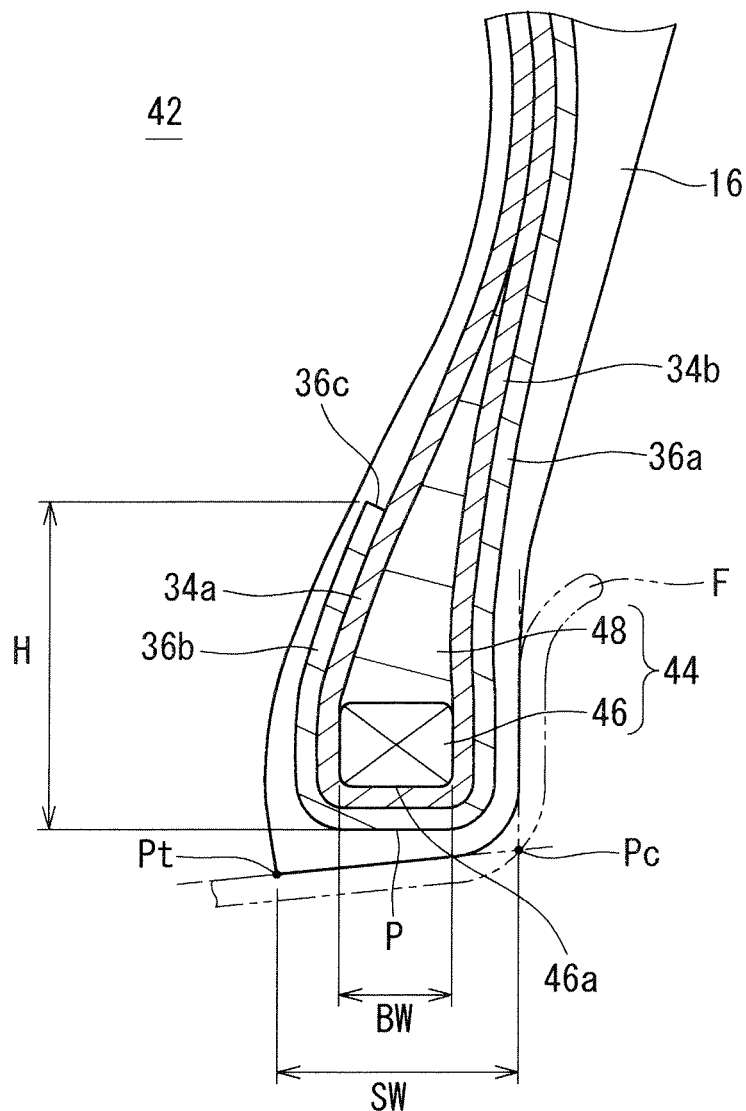
FIG. 2 is a cross-sectional view of a part of a pneumatic tire according to another embodiment of the present invention.

FIG. 2 illustrates a part of another tire 42 according to the present invention. For the tire 42, components different from the components of the tire 12 will be described. Description of the same components as in the tire 12 is not given. Further, the same components as in the tire 12 will be described by using the same reference numerals as used for the tire 12.

The tire 42 includes beads 44 instead of the beads 18. The tire 42 has the same structure as the tire 12 except that the tire 42 has the beads 44. Each bead 44 includes a core 46 and an apex 48 that extends outward from the core 46 in the radial direction. The apex 48 is tapered outward in the radial direction. The apex 48 is formed of a highly hard crosslinked rubber.

The core 46 is formed such that a non-stretchable wire is wound so as to be ring-shaped. A steel wire is typically used for the core 46. On the cross-section of the core 46, a plurality of non-stretchable wires are aligned in the axial direction at almost regular intervals, and a plurality of non-stretchable wires are aligned also in the radial direction at almost regular intervals. The aligned non-stretchable wires are covered by coating rubber. The cross-section of the core 46 has almost a rectangular shape. The beads 44 have a strand bead structure. In the description herein, the strand bead structure includes a core that is formed such that one non-stretchable wire is wound. In other words, the strand bead structure includes a so-called single winding bead structure. In the core 46, rotation is inhibited. The core 46 contributes to improvement of stiffness of the tire 42.

In FIG. 2, an alternate long and two short dashes line F represents the shape of a rim. A state in which the tire 42 is mounted on a normal rim, is represented. A point Pt represents a position of a toe of the tire 42. A point Pc represents a point of intersection of a straight line that extends along a seat surface and a straight line that extends along a contact surface that contacts with a flange. In FIG. 2, a double-headed arrow BW represents a width of a bottom surface 46a of the core 46. The width BW is measured along the bottom surface 46a. A double-headed arrow SW represents a seat surface width of the seat surface that contacts with a seat surface of a rim. The seat surface width SW is measured in a state where the tire is mounted on the rim. The seat surface width SW is measured as a distance in a straight line from the toe Pt to the point Pc of intersection.

The core 46, which has an almost rectangular cross-section, includes the bottom surface 46a that faces inward in the radial direction. For the tire 42, when the green tire is vulcanized, the second ply 36 is disposed between the bottom surface 46a of the core 46 and a wall surface of a mold. By the bottom surface 46a being provided, the second ply 36 is fixed more firmly. By the core 46 being provided, an effect of improving stiffness of the tire 42 can be more stably obtained.

In this viewpoint, the width BW of the bottom surface 46a of the core 46 is preferably great. A ratio BW/SW is preferably greater than or equal to 0.4, and more preferably greater than or equal to 0.5. The tire 42 includes the clinches 17 and the chafers 27 that protect the beads 44. In order to protect the beads 44, the BW/SW is preferably not greater than 0.7, and is more preferably greater than or equal to 0.6.

Also in the tire 12 described above, in order to assuredly fix the second ply 36 between the cores 30 and a wall surface of a mold, each core 30 preferably has a bottom surface that faces inward in the radial direction, which is not shown.

EXAMPLES

Hereinafter, effects of the present invention will become apparent according to examples. However, the present invention should not be restrictively construed based on the description of examples.

Example 1

A tire having a basic structure shown in FIG. 1 was prepared. The size of the tire was 120/70R17. The height H from the inner end P of the second ply that was turned back around the beads, to the turn-back end was 20 mm. The beads had a cable bead structure, and the cross-sectional shape of the core was round.

Comparative Example 1

Figure 3:
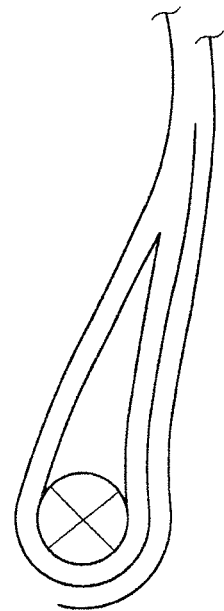
FIG. 3 illustrates (a) a structure of a tire according to a comparative example, and (b) a structure of a tire according to another comparative example.
Figure 3:
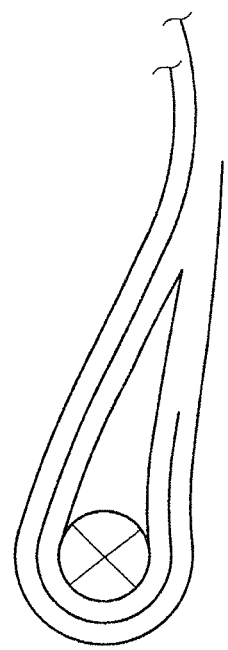

A commercially available tire having a carcass structure shown in (b) of FIG. 3 was prepared. The carcass of the tire had two carcass plies, and the two carcass plies were turned up around each bead from the inner side toward the outer side in the axial direction. The other structure was the same as for Example 1.

Comparative Example 2

Figure 4:
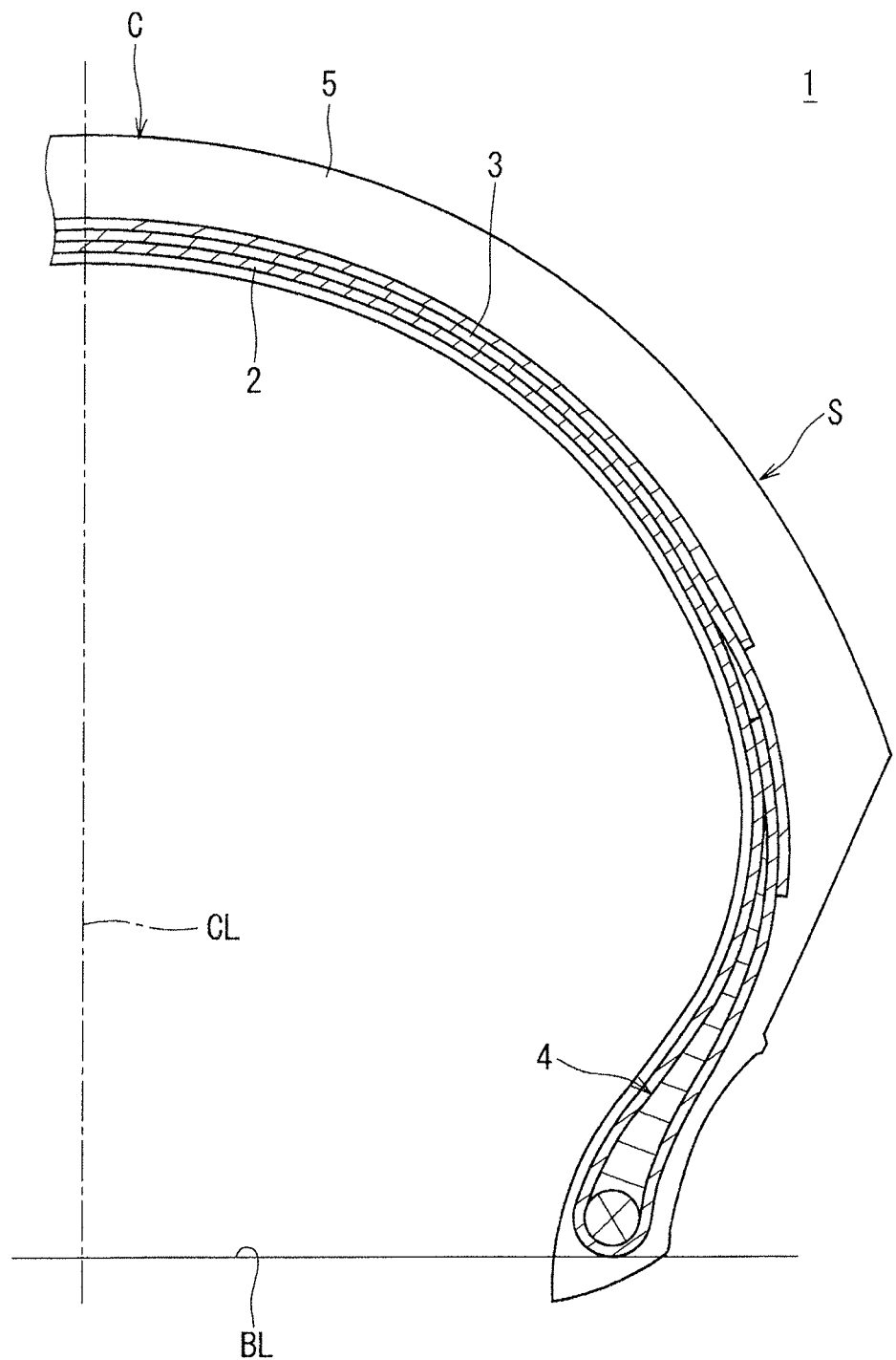
FIG. 4 is a cross-sectional view of a part of a conventional pneumatic tire.

A commercially available tire having a carcass structure shown in FIG. 4 was prepared. The carcass of the tire had two carcass plies. The inner carcass ply was turned up around the beads from the inner side toward the outer side in the axial direction. The outer carcass ply was a so-called floating ply, and was extended between the axially outer side portions of the paired beads and was not turned back around the beads. The other structure was the same as for Example 1.

Comparative Example 3

A tire having a carcass structure shown in (a) of FIG. 3 was prepared. The carcass of the tire had two carcass plies. The inner carcass ply was turned up around the beads from the inner side toward the outer side in the axial direction. The outer carcass ply was a so-called floating ply, and was extended between the axially outer side portions of the paired beads and was not turned back around the beads. The ends of the outer carcass ply were positioned at the inner ends, in the radial direction, of the cores, respectively. The other structure was the same as for Example 1, thereby obtaining the tire.

Examples 2 to 4

Tires were each obtained in the same manner as for Example 1 except that the height H was as indicated in Table 1.

Examples 5 to 9

Tires having a bead structure shown in FIG. 2 were prepared. The height H and the bead structure of each tire were as indicated in Table 2. The ratio BW/SW of the width BW of the bottom surface of the core, to the seat surface width SW was as indicated in Table 2. The other structure was the same as for Example 1, thereby obtaining the tire.

[Evaluation in Disassembling]

The tires were disassembled, and the finished dimensions were measured. Difference between the finished dimension and a design value (target value) was evaluated. Each evaluation result is indicated as an index in Tables 1 and 2 with the evaluation result of Example 6 being 100. The greater the value of the evaluation result is, the higher the evaluation is.

[Performance of Actual Vehicle]

The tires were each mounted on a normal rim (17× MT3.50), and was mounted to a front wheel of a commercially available two-wheeled automotive vehicle having an engine displacement of 1000 cc ($cm^2$). Air pressure of each tire was a normal internal pressure of 220 kPa. A commercially available tire was mounted to a rear wheel. The two-wheeled automotive vehicle was caused to run on a dry asphalt mountain road, and a sensory evaluation for steering stability and ride comfort was made by a rider. Each evaluation result is indicated as an index in Tables 1 and 2 with the evaluation result of Example 6 being 100. The greater the value of the evaluation result is, the higher the evaluation is.

TABLE 1

| | Evaluation result | | | | | | |
|---|---|---|---|---|---|---|---|
| | Comp. ex. 1 | Comp. ex. 2 | Comp. ex. 3 | Ex. 2 | Ex. 1 | Ex. 3 | Ex. 4 |
| Carcass structure | FIG. 3 (b) | FIG. 4 | FIG. 3 (a) | FIG. 1 | FIG. 1 | FIG. 1 | FIG. 1 |
| Height H (mm) | — | — | 0 | 10 | 20 | 30 | 40 |
| Bead structure | Cable bead | Cable bead | Cable bead | Cable bead | Cable bead | Cable bead | Cable bead |
| Evaluation in disassembling | 90 | 75 | 80 | 90 | 90 | 90 | 90 |
| Performance of actual vehicle | 50 | 80 | 80 | 95 | 95 | 90 | 80 |

TABLE 2

| | Evaluation result | | | | |
|---|---|---|---|---|---|
| | Ex. 5 | Ex. 6 | Ex. 7 | Ex. 8 | Ex. 9 |
| Carcass structure | FIG. 2 | FIG. 2 | FIG. 2 | FIG. 2 | FIG. 2 |
| Height H (mm) | 20 | 20 | 20 | 20 | 20 |
| Bead structure | Strand bead | Strand bead | Strand bead | Strand bead | Strand bead |
| Ratio BW/SW | 0.4 | 0.5 | 0.6 | 0.7 | 0.8 |
| Evaluation in disassembling | 95 | 100 | 100 | 95 | 85 |
| Performance of actual vehicle | 98 | 100 | 100 | 98 | 90 |

As indicated in Table 1 and Table 2, the evaluation of the tires of examples is higher than the evaluation of the tires of comparative example. This evaluation result clearly indicates that the present invention is superior.

INDUSTRIAL APPLICABILITY

The tire described above is widely applicable not only to front wheels of two-wheeled automotive vehicles but also as pneumatic tires mounted to rear wheels.

DESCRIPTION OF THE REFERENCE CHARACTERS 12, 42 . . . tire
14 . . . tread
18, 44 . . . bead
20 . . . carcass
28 . . . tread surface
30, 46 . . . core
32, 48 . . . apex
34 . . . first ply
36 . . . second ply

The invention claimed is:

1. A two-wheeled motorcycle pneumatic tire, the pneumatic tire comprising:
   a tread;
   a pair of sidewalls;
   a pair of beads; and
   a carcass, wherein
   the sidewalls extend inward from ends, respectively, of the tread in a radial direction,
   the beads are disposed inward of the sidewalls, respectively, in the radial direction,
   the carcass is extended on and between one of the beads and the other of the beads along inner sides of the tread and the sidewalls,
   the carcass includes a first ply and a second ply that is layered outward of the first ply,
   the first ply is turned up around the beads from an inner side toward an outer side in an axial direction, and, by the first ply being turned up, the first ply includes a main portion and turned-up portions,
   the second ply is turned back around the beads from the outer side toward the inner side in the axial direction, and, by the second ply being turned back, the second ply includes a main portion and turned-back portions, and
   wherein the tread forms a tread surface that can contact a road surface, the tread surface having a pair of axially outermost ends,
   wherein the first ply and the second ply extend on and between one of the beads and the other of the beads,
   wherein each turned-up portion of the first ply has a turned-up end portion at a radially outer end of the turned-up portion,
   wherein each turned-up portion of the first ply extends in the radial direction from the respective bead to axially inward of the tread such that the turned up end is positioned axially inward and radially outward of the respective axially outermost end of the tread surface, and
   wherein a radial height H from a radial inner end of the second ply that is turned back around the beads, to a turn-back end, is greater than or equal to 10 mm and not greater than 20 mm.

2. The tire according to claim 1, wherein the first ply directly contacts surfaces of the beads.

3. The tire according to claim 1, wherein the carcass consists of the first ply and the second ply that is layered outward of the first ply.

4. The tire according to claim 1, wherein a radius of curvature of the tread at an equator plane, is greater than or equal to 50 mm and not greater than 150 mm.

5. The tire according to claim 1, wherein each of the beads includes a core and an apex that extends outward from the core in the radial direction, and
   the core has a bottom surface that is formed as a plane that faces inward in the radial direction.

6. The tire according to claim 5, wherein a radius of curvature of the tread at an equator plane, is greater than or equal to 50 mm and not greater than 150 mm.

7. The tire according to claim 5, wherein a ratio BW/SW of a width BW of the bottom surface to a seat surface width SW of a seat surface which contacts with a seat surface of a normal rim, is greater than or equal to 0.4 and not greater than 0.7.

8. The tire according to claim 7, wherein a radius of curvature of the tread at an equator plane, is greater than or equal to 50 mm and not greater than 150 mm.

* * * * *